Jan. 19, 1965 J. RUDELICK 3,166,499
ION EXCHANGE WATER SOFTENING SYSTEM
Original Filed Oct. 26, 1960 3 Sheets-Sheet 1

Inventor
John Rudelick
By [Attorneys]

Jan. 19, 1965  J. RUDELICK  3,166,499
ION EXCHANGE WATER SOFTENING SYSTEM
Original Filed Oct. 26, 1960  3 Sheets-Sheet 2
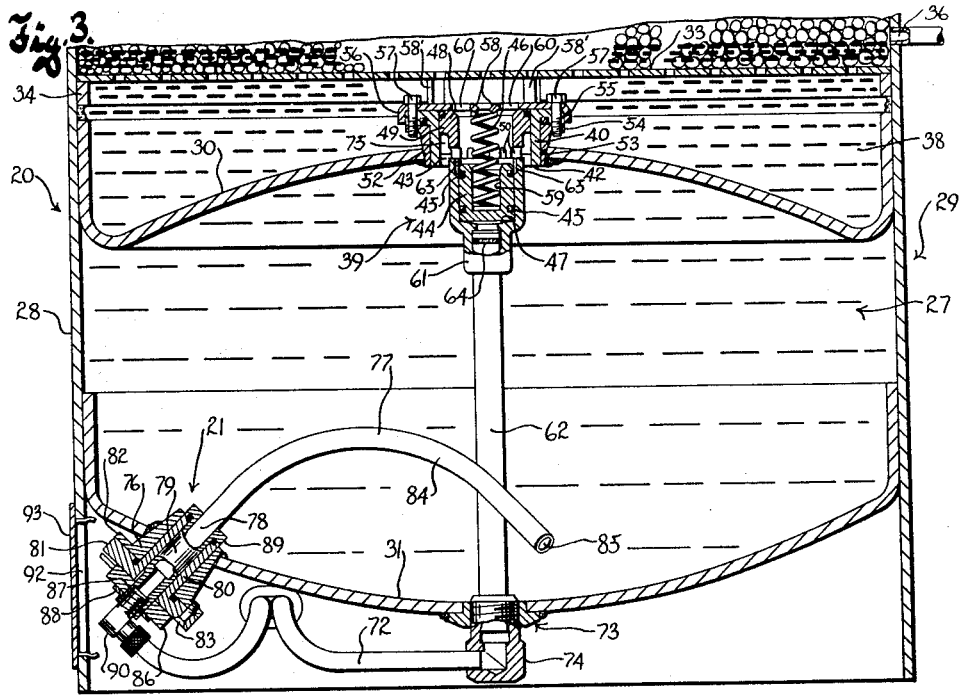
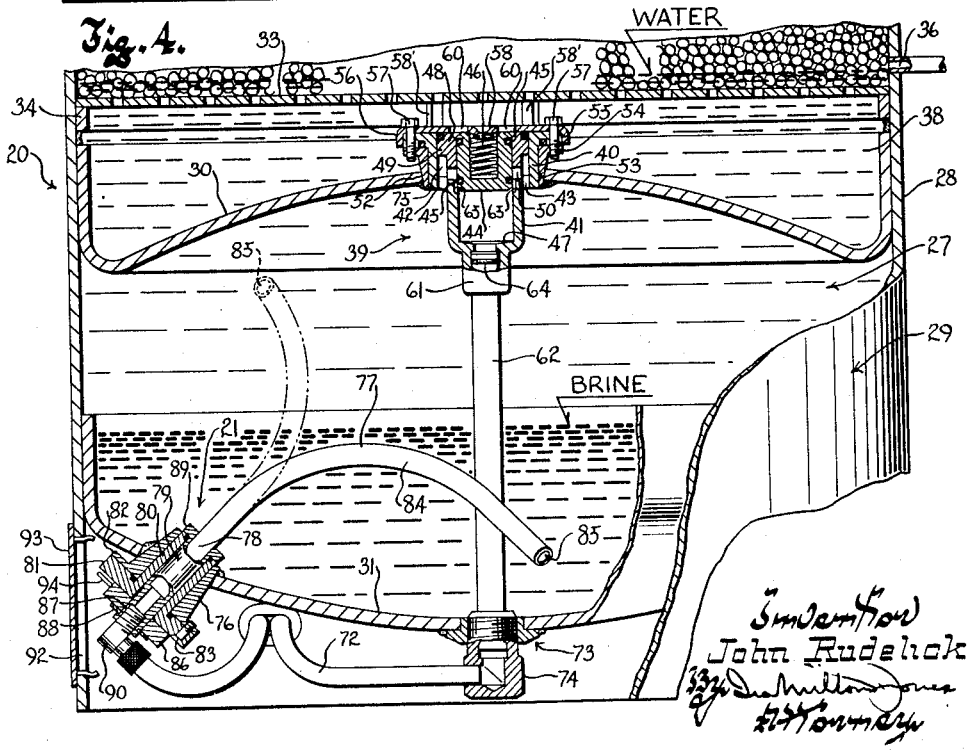
INVENTOR
John Rudelick
ATTORNEY

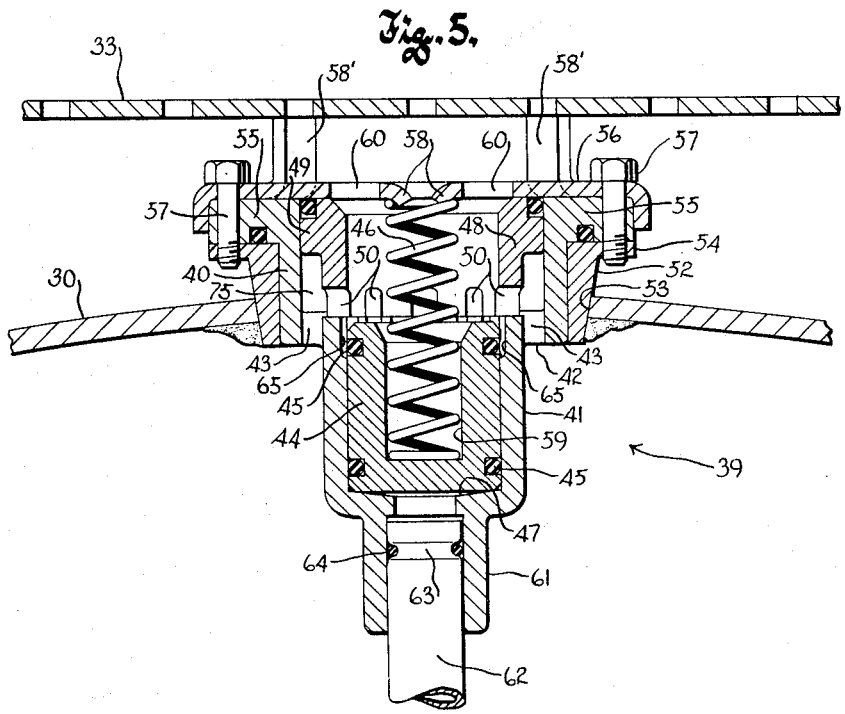
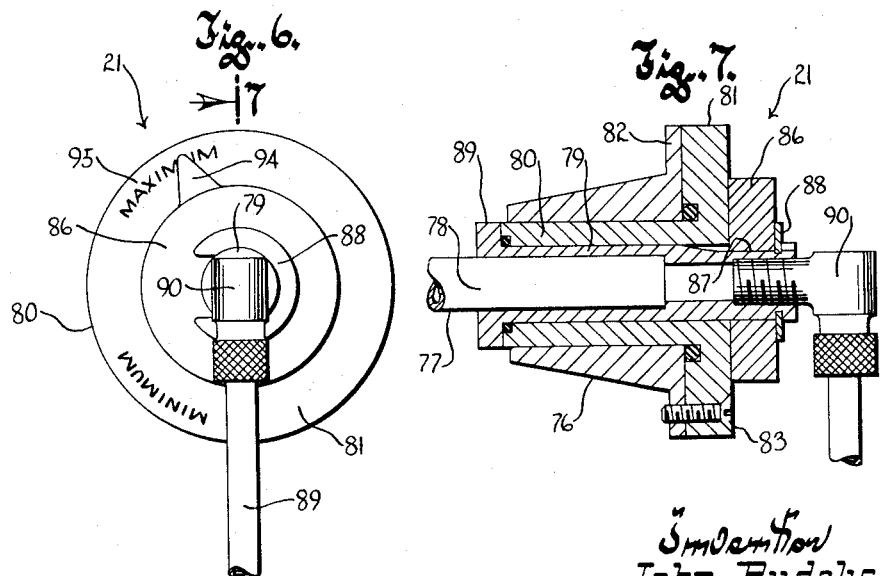

United States Patent Office 3,166,499
Patented Jan. 19, 1965

3,166,499
ION EXCHANGE WATER SOFTENING SYSTEM
John Rudelick, Milwaukee, Wis., assignor to Bruner
 Corporation, Milwaukee, Wis., a corporation of
 Wisconsin
Original application Oct. 26, 1960, Ser. No. 66,379, now
 Patent No. 3,058,816, dated Oct. 16, 1962. Divided
 and this application May 21, 1962, Ser. No. 196,208
4 Claims. (Cl. 210—136)

This application is a division of my co-pending application Serial No. 66,379, filed October 26, 1960, now Patent No. 3,058,816, dated October 16, 1962. Like said patent, this invention also relates to water softeners of the ion exchange type. However, it refers more particularly to improvements in a water softener system embodying brine making and dispensing apparatus of the type specifically claimed in said patent.

The main component of any water softening system comprises a tank containing ion exchange resin having an affinity for the hardness producing calcium and magnesium ions of hard water in preference to its own sodium ions. Hence, when hard water is passed through a bed of such ion exchange material, an exchange is made between the calcium and magnesium ions of the hard water and the sodium ions of the ion exchange material and softened water results.

As is well known, however, the water softening capacity of the ion exchange material is limited, and after a period of use depending upon the amount and hardness of the water treated thereby, the ion exchange resin becomes saturated with calcium and magnesium ions and must be regenerated. This is effected by passing brine through the bed of ion exchange material to remove the calcium and magnesium ions it acquired during softening service and to replace them with sodium ions from the brine regenerant.

The regeneration of the base or ion exchange material of water softeners is effected in various ways. Most commonly, in so called low cost water softening systems, regeneration is carried out manually. It involves charging a quantity of salt directly into the top of the tank containing the ion exchange material and the manipulation of valves to route fresh water into the top of the tank and carry salt in solution with it through the ion exchange material, and to direct the resulting effluent to a drain or sewer.

More costly water softening systems usually employ a tank separate from the softener tank in which a substantial supply of salt may be stored and in which the brine is formed to be transferred to the softener tank either by semi-automatic or fully automatic control instrumentalities governing regeneration. Nearly all of these systems having separate brine tanks employ an injector in a fresh water line leading to the water softening tank to effect eduction of brine from the brine tank and the delivery of such brine, diluted by water, to the water softening tank. While injectors of the type described operate satisfactorily when the pressure of water from the hard water source is sufficiently high, it is a well known fact that regenerating systems employing such injectors fail to accomplish their intended purpose in cases where the pressure of source water falls below a predetermined minimum.

The present invention has as its objective to provide an ion exchange water softening system featuring pressure brining means that operates without an injector, and which system is capable of being controlled by exceptionally simple means, comprising a two position control valve which effects service operation of the system in one operating position thereof, and which effects complete regeneration in its only other position.

With the above and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed according to the best mode so far devised for the practical application of the principles thereof, and in which:

FIGURE 3 is an enlarged fragmentary sectional view of a portion of the brine making and dispensing device, showing the brine valve which forms a part thereof in the position it occupies during normal softening service of the system;

FIGURE 4 is a view similar to FIGURE 3 but illustrating the brine valve in its regenerating position;

FIGURE 5 is an enlarged sectional view through the brine valve;

FIGURE 6 is an enlarged detail view, taken on the plane of the line 6—6 of FIGURE 4, and showing the means for adjusting the amount of brine to be dispensed; and FIGURE 7 is a sectional view taken through FIGURE 6 on the plane of the line 7—7.

Figure 1:
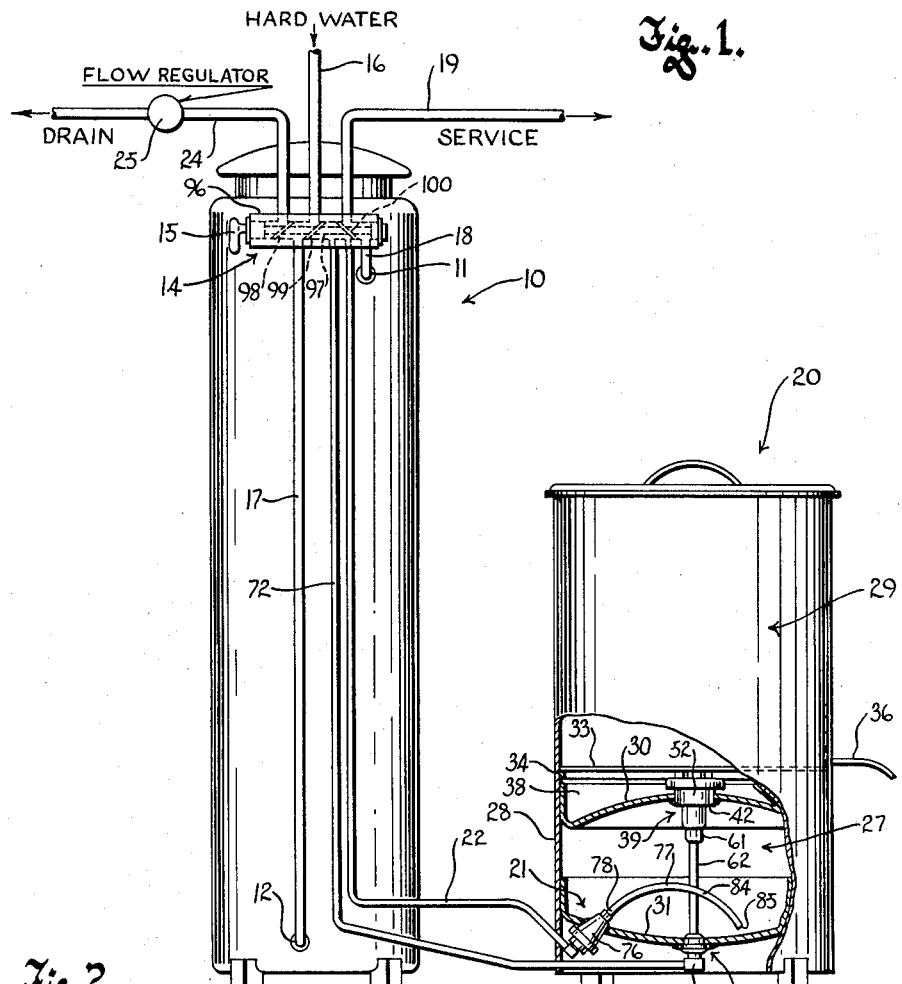
FIGURE 1 is an elevational view of a water softening system incorporating the brine making and dispensing device of this invention.

Referring now more particularly to the accompanying drawings, in which like reference characters have been applied to like parts throughout the several views, the numeral 10 generally designates a water softener tank of a more or less conventional type containing a bed of ion exchange resin (not shown) and having a port 11 near its top and a port 12 near its bottom. A control valve generally designated 14, here shown by way of example as having a manually operable rotatable valve element 15, governs the operation of the water softener. According to this invention the control valve is movable to only two operating positions to control the service operation of the system in one position and complete regeneration of the system in the other position of the valve. In the service position of the valve shown by dotted lines in FIGURE 1, hard water from a source thereof is led into the body of the control valve through a duct 16 and is directed by the valve into a supply duct 17 which connects with the port 12 at the bottom portion of the softener tank. During normal or softening operation, therefore, the port 12 constitutes the inlet through which hard water is admitted into the tank. Such water passes upwardly in the tank and through the bed of ion exchange material therein, and issues as soft water from the port 11 at the upper portion of the tank. Consequently, during normal operation, the port 11 constitutes the outlet of the softener tank, and the softened water issuing therefrom is led into the body of the control valve 14 through a short delivery duct 18, to be directed by the valve into the service line 19 leading to the various taps or faucets from which softened water may be drawn.

Regeneration of the ion exchange material in the softener tank, after a period of time depending upon the amount and hardness of the water passed through the softener, is effected by treating the bed of ion exchange material with brine. This is accomplished by the brine making and dispensing device 20, as a consequence of rotation of the valve element 15 of the control valve to its regenerating position shown in FIGURE 2. As will be brought out in greater detail hereinafter, actuation of the control valve to its regenerating position effects expulsion of concentrated brine through the outlet 21 of the brine making and dispensing device and the delivery of such brine, via a duct 22, into the body of the control valve from whence it is directed by the valve element therein into the duct 18 leading to the port 11 in the upper end portion of the softener tank. The concentrated brine thus introduced in the upper portion of the softener tank passes downwardly in the softener tank, through the bed of ion exchange material therein, and the effluent discharges from the port 12 in the bottom of the tank into the duct 17 to be directed by the control valve into a duct 24 leading to a drain or sewer. It is important to note that a constant flow device 25, of a type known as a Dole valve, is connected in the drain line 24 so as to automatically regulate the rate at which concentrated brine flows through the water softener tank.

The brine making and dispensing device 20 includes a tank 27 in which concentrated brine is stored for regenerating purposes. While the storage tank 27 may be of unitary construction, it has here been shown as formed partly by a portion of the cylindrical side wall 28 of an upright cylindrical shell 29, and by spaced top and bottom walls 30 and 31, respectively, extending across the interior of the shell near the bottom portion thereof and welded all around their peripheral portions to the side wall 28 of the shell. The construction of the brine storage tank 27 is best illustrated in FIGURES 3 and 4, where it will be noted that the top and bottom walls 30 and 31, respectively, of the storage tank are spherically surfaced and have their concave sides opposing one another and thus facing the interior of the storage tank.

The brine storage tank 27 occupies only about one-third of the height of the shell 29, being located in the bottom portion thereof. The upper two-thirds of the shell 29 provides the side wall of a bin or receptacle in which a substantial quantity of salt in a dry form may be maintained. The bottom of the salt bin or receptacle is provided by a foraminous horizontal wall 33 which extends entirely across the shell a short distance above the top wall 30 of the brine storage tank. The wall 33 is preferably removably mounted in the shell as by having its peripheral portion resting upon a ring 34 welded to the side wall 28 of the shell.

With the construction described, a substantial quantity of dry salt, in the form of pellets or blocks, or even rock salt, may be loaded into the salt bin or receptacle to rest upon the foraminous wall 33 at its bottom.

As stated previously, the wall 33 is located a short distance above the top wall 30 of the brine storage tank, but it is important to note that the foraminous wall is also located a small distance beneath the level of an overflow port 36 in the side wall 28 of the shell. The overflow port 36 is provided to predetermine and establish the level of liquid in the brine making and dispensing device, and to assure that only a small body of salt in the bottom of the salt bin or receptacle will be immersed in water to form brine.

From the description thus far, it will be apparent that the top wall 30 of the brine storage tank, in cooperation with the side wall 28 of the shell and specifically that portion thereof which extends from the top wall 30 of the storage tank to the overlow port 36, defines a vessel 38 in which liquid may be contained to a level corresponding to that of the overflow port 36, or slightly above the foraminous wall 33. The liquid originally charged into brine making and dispensing device, of course, is water, and consequently water in the vessel 38 will dissolve salt occupying the space immediately above the wall 33 to form brine. The vessel 38, therefore, can be considered the brine making vessel.

The brine making vessel 38 and the brine storage tank 27 are normally communicated with one another by means of a brine valve, generally designated 39, mounted in the center of the top wall 30 of the brine storage tank. The brine valve 39 has a substantially tubular body of two different diameters, the larger upper portion 40 thereof projecting into the interior of the brine making vessel 38 and the smaller lower portion 41 of the body projecting downwardly into the brine storage tank from an apertured inwardly projecting ring 42 formed on the bottom of the upper body portion 40. The apertures 43 in the ring, provide ports by which the interior of the storage tank 27 is normally communicated with the interior of the brine making vessel through the open upper end portion of the valve body.

Communication between the brine making vessel and the brine storage tank therebeneath is controlled by a piston 44 received in the interior of the brine valve for up and down motion, and having O rings 45 confined in circumferential grooves near its opposite ends to slidingly and sealingly engage the interior of the valve body. A compression spring 46 acts on the piston in a downward direction to yieldingly hold it in a normal position within the lower body portion 41, engaging a shoulder 47 in the interior of the valve body, at which position the piston establishes communication between the interior of the brine making vessel 38 and the interior of the brine storage tank 27.

The piston is movable upwardly against the bias of its spring 46 to a position closing off communication between the brine making vessel and the brine storage tank, and to establish communication between the space in the lower body portion of the brine valve, beneath the piston, and the interior of the brine storage tank. In order to guide such upward motion of the piston, a bushing 48 is confined in the upper body portion of the valve with the lower end of its wall seating endwise upon and aligning with the wall of the lower body portion 41 of the valve. The upper portion of the bushing has an external flange 49 thereon which fits the interior of the upper body portion 40 of the valve and holds the bushing coaxial with the valve body, with the bore of the bushing forming a substantially uninterrupted upward continuation of the bore in the lower body portion of the valve.

Although the bushing 48 seats endwise upon the lower body portion 41 of the brine valve, communication between the interiors of the brine making vessel and the brine storage tank in the normal position of the piston 44 is assured by reason of the provision of circumferentially spaced notches 50 in the lower end of the bushing, the notches defining ports which are auxiliary to the ports 43 and lie just above the top of the piston.

The brine valve 39, when the piston thereof is in its normal position shown in FIGURES 3 and 5, enables the brine storage tank 27 and the brine making vessel 38 to be completely filled with water to the level determined by the overflow port 36 when the brine making and regenerating device is first set up for operation. It also provides for natural circulation of brine formed in the vessel 38 downwardly through the upper open end of the valve body and the ports 50 and 43 to the interior of the brine storage tank 27, which circulation is induced by the difference in specific gravity between brine formed in the vessel 38 and water in both the vessel and the storage tank therebeneath. Consequently, the heavier brine descending through the brine valve into the interior of the brine storage tank causes the lighter water in the storage tank to be displaced upwardly through the ports 43 and 50 of the brine valve and into the brine making vessel 38. As this natural circulation of the brine and fresh water continues, the brine solution increases in salinity until after a period of time both the brine making vessel 38 and the brine storage tank 27 will be filled with concentrated brine. During this time, of course, the supply of dry salt in the bin or receptacle above the brine making vessel will settle slightly, until the salt solution or brine in the device reaches the saturation point.

One of the features of the brine making and dispensing device is that the brine valve 39 is readily detachably secured in place in the top wall 30 of the brine storage tank, so as to not only facilitate its installation but to make it possible to remove the valve for service or replacement. For this purpose, an adapter ring 52 is fixed in a hole 53 in the center of the top wall 30, preferably being welded thereto. The adapter ring has an outwardly extending mounting flange 54 on its upper end, spaced a slight distance above the top wall 30 of the storage tank.

The larger diameter upper body portion 40 of the brine valve is received within the adapter ring 52 and has a circumferential flange 55 formed on its upper end, extending outwardly therefrom and seating upon the flange 54 of the adapter ring. A combined retainer and spring seat member 56 covers the flange 55 of the valve body, and screws 57 passing through holes in the retainer and the flange 55 and threading into the mounting flange 54 of the adapter ring serve to removably secure the brine valve in place. Deformations 58 in the center of the retainer are directed downwardly into the upper end of the spring 46, and cooperate with an upwardly opening well 59 in the piston 44, in which the lower portion of the spring is received, to hold the spring coaxial with the piston. The retainer 56, of course, holds the bushing or piston guide 48 down onto the lower body portion of the valve, and it also has a plurality of apertures 60 therein grouped around the spring seat deformations 58 and registering with the open upper end of the valve body to provide unrestricted communication between the latter and the brine making vessel.

Three or more circumferentially equispaced lugs 58' are shown struck upwardly from the retainer 56 to engage the underside of the foraminous wall 33, to thus support the central portion thereof.

At its bottom, the valve body is formed with a reduced neck 61 projecting downwardly from the lower body portion 41 and having the upper end of a water inlet tube 62, slidingly received therein, in liquid sealed relation with the interior of the neck. For this latter purpose the upper end portion of the water inlet tube inside the neck 61 has a circumferential deformity providing a groove 63 in which an O-ring seal 64 is confined, the O-ring bearing resiliently against the inner surface of the neck. The shoulder 47 which defines the normal position of the piston 44 is located at the junction between the reduced neck 61 and the lower body portion of the brine valve.

With the construction described, fresh water from the source thereof, when delivered into the tube 62, is free to flow into the lower end portion of the brine valve and exert pressure on the bottom of the piston 44 of the valve to lift the same upwardly against the bias of its spring 46, to a position such as seen in FIGURE 4, at which the top of the piston abuts the underside of the retainer 56 and closes off the auxiliary ports 50 from the brine making vessel, and the bottom of the piston uncovers the lower ends of a series of axially extending circumferentially equispaced grooves 65 in the inner wall surface of the lower body portion 41. The grooves 65 register with and open to the auxiliary port defining notches 50 in the bushing 48, so that when the piston in moved to its upper limit seen in FIGURE 4, it closes off the brine storage tank from the brine making vessel above it, but enables fresh water entering the lower part of the valve body to flow upwardly through the grooves 65 and out of the valve body through the ports 50 and 43, to the interior of the brine storage tank.

Fresh water from the source thereof is delivered into the tube 62 leading into the bottom of the brine valve 39 at the dictation of the control valve 14. Normally, the control valve blocks communication between the hard water supply line 16 and a duct 72 leading to an inlet port 73 in the center of the bottom wall 31 of the brine storage tank. The duct 72 connects with the tube 62 and for this purpose, an inlet fitting 74 is fixed in the port 73 and receives the lower end of the inlet tube and the end of the duct 72 remote from the control valve 14.

Figure 2:
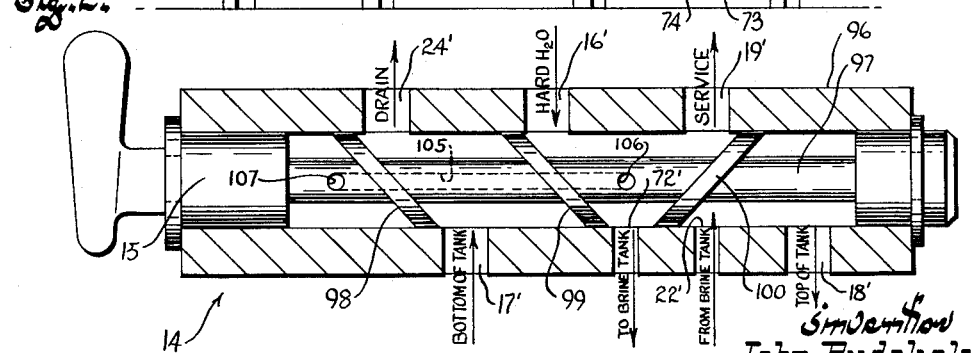
FIGURE 2 is an enlarged longitudinal sectional view of the control valve by which normal softening service and regeneration is governed.

When the control valve is actuated to its regenerating postion seen in FIGURE 2, however, it communicates the hard water supply line 16 with the duct 72 so that fresh water from the source flows upwardly in the inlet tube 62 and into the interior of the brine valve 39 to raise the piston 44 thereof to its regenerating position seen in FIGURE 4. Fresh water from the source may then flow slowly into the top of the brine storage tank, to thereby cause concentrated brine in the tank to be expelled therefrom through its outlet 21.

It is an important feature that the grooves 65 through which the fresh water must flow to reach the interior of the brine storage tank are relatively shallow to provide restricted communication between the lower end of the valve body and what may be termed an expansion chamber 75 in the upper body portion 40 of the brine valve, surrounding the auxiliary ports 50 and directly above the main ports 43. Consequently, fresh water enters the interior of the brine storage tank, at its top, at a relatively slow rate so as to minimize agitation of the concentrated brine therein and assure against such turbulence as might cause admixture of the fresh water with the brine and result in the dilution of the brine.

Obviously, the flow regulator 25 in the drain line 24, being connected with the outlet 21 of the brine tank through the water softener tank 10 and the duct 22, can alone serve to place sufficient back pressure upon the brine tank so as to assure such entry of fresh water into the brine tank at the desired slow rate and velocity. This function is performed by the flow regulator 25 without in anywise diminishing the pressure of water in the inlet chamber of the brine valve and which pressure must be maintained at a high enough value to insure proper actuation of the piston 44 of the valve to its uppermost postion against the drag of it O-rings on the cylinder wall and the bias of its spring 46.

The outlet 21 of the brine tank opens through a tubular fitting 76 fixed in the bottom wall 31 of the brine storage tank, near one side of the tank, and comprises a tube 77 having a straight portion 78 fixed within a sleeve 79. The sleeve is freely rotatably mounted in a bushing 80, the bushing recieved in the fitting 76 and having a flange 81 at its outer end seating against a similar flange 82 on the fitting to enable the bushing to be detachably secured to the fitting by screws 83 threaded into the flange on the fitting.

The tube 77 has a curved portion 84 within the brine storage tank, and the extremity of this curved portion provides a mouth 85 through which brine is expelled from the tank whenever fresh water is admitted into the upper end of the tank in the manner described.

The sleeve 79, within which the straight portion 78 of the outlet tube is received, projects outwardly of the bushing beyond its flange 81 to receive an actuating knob 86, and it is keyed to the knob as at 87. A C washer 88 snapped into a groove in the outer end portion of the sleeve, at the front of the knob 86, cooperates with a circumferential flange 89 projecting from the inner end of the sleeve, behind the bushing 80, to hold the sleeve against axial displacement with respect to the bushing.

Consequently, when the knob is rotated manually, the sleeve 79 and the outlet tube 77 are rotated with it to adjust the position of the curved portion 84 of the outlet tube within the brine storage tank.

In the position of adjustment shown in FIGURES 3 and 4, the discharge tube is set for near maximum withdrawal of brine from the storage tank by reason of the fact that the curved end of the tube projects downwardly and inwardly toward the center of the tank, to have its mouth 85 substantially close to the bottom wall 31 of the storage tank, adjacent to one side of the inlet tube 62. If the knob 86 is rotated in the direction to move the curved inner end portion of the discharge tube away from the inlet tube 62, it will cause the mouth 85 of the discharge tube to be lifted away from the bottom wall 31 of the storage tank a distance depending upon the angle through which the knob is rotated. Consequently, if the knob is rotated through an angle constituting nearly one-half a complete revolution from its position seen in FIGURES 3, 4 and 6, the mouth of the discharge tube will be carried from its lowermost position of maximum brine withdrawal to a minimum position of brine withdrawal such as indicated in construction lines in FIGURE 4, with the mouth 85 of the tube near the top wall 30 of the brine storage tank.

Thus it will be seen that whenever the control valve is actuated to its regenerating position seen in FIGURE 2, to admit fresh water into the upper end of the brine storage tank, an amount of brine will be discharged through the outlet 21 of the storage tank depending upon the position of the mouth 85 of the discharge tube with respect to the top and bottom walls of the tank. When fresh water accumulating in the upper portion of the storage tank, above the concentrated brine therein, reaches the level of the mouth 85 of the discharge tube, the withdrawal of brine will be terminated and only fresh water will flow out of the brine storage tank and into the top of the water softener tank to effect slow downflow rinsing or flushing of brine from the ion exchange material in the tank.

The brine discharging from the outlet 21 of the brine storage tank enters an angle fitting 90 screwed into the outer end of the sleeve 79 and flows through the duct 22 leading to the control valve 14. The duct 22 enters the body of the control valve at a location such that the rotatable valve element 15 of the valve will communicate it with the port 11 in the upper end of the softener tank only when the control valve has been actuated to its regenerating position seen in FIGURE 2.

The outlet 21 for the brine storage tank is preferably located near the side wall 28 of the shell containing the brine storage tank, and near the bottom thereof, in registry with an access hole 92 in the shell normally closed by a snap-on cover 93. Hence, upon removal of the cover 93, an operator of the device may readily set or adjust the position of the brine discharge tube 77 within the brine storage tank, and the position of adjustment thereof may be readily indicated by means of a pointer 94 on the knob 86 and cooperating indicia 95 on the outer face of the flange 81 of the bushing 80.

It will be appreciated, of course, that at least a portion of the duct 22 adjacent to its connection with the outlet 21 may be made of flexible material so as to permit rotational adjustment of the brine discharge tube 77 in the manner described.

The control valve 14 for effecting the desired routing of liquid during normal softening service and during regeneration of the water softener has here been shown more or less diagrammatically as a two-position rotatable spool valve such as forms the subject of my co-pending application Serial No. 7,832, filed February 10, 1960, now Patent No. 3,090,396, dated May 21, 1963. It comprises a tubular body 96 having the rotatable valve element 15 freely rotatably received therein and preferably sealed at its ends with respect to the valve body. By way of example, the rotatable valve element may have a reduced stem portion 97 within the valve body, and three axially spaced oblique lands 98, 99 and 100 formed thereon. These lands completely encircle the stem and while two adjacent lands 98 and 99 are disposed at the same angle with respect to the stem axis, the third land 100 is disposed at an angle opposite to that of the lands 98 and 99.

The valve body has three ports 24', 16' and 19' in its upper side respectively communicating with the drain line 24, the hard water supply line 16, and the service line 19. At its lower side, the body has a series of four ports designated 17', 72', 22' and 18'. The ports 17' and 18' communicate with the ducts 17 and 18 respectively leading to the ports 12 and 11 in the softener tank; while the ports 72' and 22' communicate with the ducts 72 and 22 respectively leading to the water inlet port 73 and the outlet fitting 90 on the brine storage tank 27.

In the normal or soft water position of the valve element 15 seen in FIGURE 1, the land 98 thereon blocks communication between the drain port 24' and the port 17' while the land 99 establishes communication between the port 17' and the port 16' through which hard water from the source thereof enters the valve body. Consequently, hard water flows into the lower end of the softener tank through its port 12.

Similarly, the land 100 establishes communication between the service port 19' in the valve body and the port 18' which is connected with the port 11 in the top portion of the softener tank. Hence, soft water issuing from the top port 11 of the softener tank flows through the control valve to the service line 19.

Note that the lands 99 and 100 cooperate with one another in the normal position of the control valve to maintain the ports 72' and 22' in the valve body closed off from the remaining ports in the body. In other words, the brine storage tank 27 is completely isolated from the softener tank during normal operation of the softener.

When the valve element 15 is rotated in either direction through an angle of 180° to its regenerating position seen in FIGURE 2, it communicates ports 17' and 24' in the valve body to connect the port 12 at the bottom of the softener tank with the drain line 24; it communicates ports 16' and 19' in the valve body to connect the water supply line 16 with the service line to assure that hard water will be available for use throughout the entire regenerating and rinsing periods; it communicates the water supply port 16' with the port 72' so that fresh water may flow down through the duct 72 and upwardly in the water inlet tube 62 in the brine storage tank into the bottom of the brine valve therein to raise the piston 44 of the valve of the regenerating or brine discharging position of the piston seen in FIGURE 4; and it also communicates control valve ports 22' and 18' so that brine expelled from the storage tank 27 by the admission of fresh water into the top thereof will be directed into the top port 11 of the water softener tank.

Thus, concentrated brine is fed into the upper end of the softener tank to effect regeneration of the bed of ion exchange material in the tank by the downward passage of the brine therethrough. The effluent discharging from the port 12 in the lower end of the softener tank flows through the control valve ports 17' and 24' and is led to a drain or sewer through the drain line 24.

The flow regulator or Dole valve 25 in the drain line, however, provides a restriction, the size of which is automatically decreased in accordance with an increase in the pressure of brine effluent flowing to drain, and it operates to assure a substantially slow uniform rate of flow of the concentrated brine out of the brine tank and through the softener tank during regeneration, and rinsing despite variations in the pressure of water from the hard water source.

During regeneration, the fresh water slowly introduced into the upper portion of the brine storage tank, in the manner described previously, causes concentrated brine to be expelled from the storage tank in an amount depending upon the setting of the brine discharge tube 77, or more particularly, upon the location of the mouth 85 of the discharge tube with respect to the bottom wall 31 of the storage tank. In this respect, it will be appreciated that since the fresh water is introduced into the brine storage tank substantially without creating such turbulence as might result in admixture thereof with the brine, the fresh water will stratify and accumulate in the upper portion of the brine tank until its descending surface junction with the brine reaches the mouth 85 of the brine discharge tube 77. Thereafter, the expulsion of concentrated brine from the storage tank ceases, and only fresh water flows out of the discharge tube 77 for delivery into the top of the water softener tank, to initiate a downflow rinsing operation which would be extended over a period of time sufficient to assure complete rinsing of brine from the ion exchange material in the softener tank.

When rinsing is completed in the manner described, the valve element of the control valve 14 may be returned to its normal position seen in FIGURE 1, to restore the water softening system to upflow service operation. When the valve element of the control valve is returned to its service position, it vents the space below the piston 44 of the brine valve to the drain line 24, to assure that the piston will be promptly returned by its spring 46 to its lowermost position at which it shuts off communication between the water inlet tube 62 and the interior of the brine storage tank and again establishes communication between the brine forming vessel and the storage tank. This venting of the space in the body portion 41 of the brine valve is made possible by an axial passage 105 in the stem 97 of the valve element in the control valve, which passage opens through a radial hole 106 at one end into the space between the lands 99 and 100, and opens through another radial hole 107 at its other end into the space to the left of the land 98. Consequently, in the regenerating position of the valve element seen in FIGURE 2, the venting passage 105 for the brine valve is closed off from the drain port 24' by the land 98, but serves to communicate the port 72' and the water inlet tube 62 with the drain port 24' in the service position of the valve element seen in FIGURE 1.

In this way, there is no possibility that water might become trapped in the inlet tube 62 and prevent the brine valve piston 44 from returning to its lowermost position under the biasing force of its spring 46 as soon as the control valve is moved to its service position, and the brining apparatus 20 is placed in operation to begin formation of a new batch of concentrated brine for storage in the tank 27 as soon as normal service operation of the softener is resumed following the rinsing operation described previously.

Again referring to the brine making and dispensing device, it will be observed that it will always function so that the amount of brine dispensed thereby will be replaced by an equal amount of fresh water. Consequently, once the level of liquid in the device has been established, by the overflow port 36, the level will remain unchanged thereafter. In this respect, it will be appreciated that evaporation of liquid from the brine making vessel is normally prevented by the supply of dry salt in the salt bin or receptacle, and to further assure against undesirable evaporation, the bin may be provided with a cover like those usually employed to close the tops of conventional brine tanks.

From the foregoing description, together with the accompanying drawings, it will be apparent to those skilled in the art that this invention provides a water softening system which features components of improved construction that make it possible for a simple two position control valve to govern service operation as well as the necessary regeneration operations of the system.

What is claimed as my invention is:

1. In a water softening system, the combination of: a softener tank containing ion exchange material; means providing supply and delivery ducts that open into lower and upper portions of the tank, respectively; means providing a brine forming vessel; means providing a substantially closed storage tank mounted beneath the vessel, and in which concentrated brine can be stored; means communicating the bottom of the vessel with the storage tank, including port means opening into the top of the storage tank to provide for gravity induced exchange of brine formed in the vessel for water filling the storage tank; means providing a water inlet duct for the storage tank, having an outlet port opening into the storage tank near its top; means providing a brine valve having a valve member movable from a first position closing said outlet port to a second position opening said outlet port to the storage tank and closing said port means to thus block communication between the brine forming vessel and the storage tank; spring means at all times exerting yielding bias on the valve member and by which the valve member is biased to said first position thereof; means providing a fluid pressure responsive actuator for said valve member, operable to effect movement thereof against the bias thereon to its second position in response to pressure in said inlet duct when the latter is connected with a source of water under pressure; means providing a brine outlet duct having a portion in the storage tank arranged with its mouth spaced a distance beneath the top thereof, through which concentrated brine in the storage tank is expelled in consequence of the admittance of water under pressure into the storage tank in said second position of the valve member; a control valve to govern service, brining and rinsing operation of the system, said control valve comprising a body having first and second system ports respectively connected with said supply and delivery ducts, first and second regenerating ports respectively connected with said water inlet and brine outlet ducts, an inlet port connectible with a source of hard water under pressure, a service port connectible with a service system, a drain port connectible with a sewer, a bore in the body with which said ports communicate, and a two position valve element in the bore movable between service and regenerating positions; means on the valve element operable in the service position thereof to communicate said inlet port with one of the system ports and to communicate the other system port with the service port to thereby provide for service flow of water to be softened through the softener tank, said last named means being operable in the regenerating position of the valve element to communicate said first system port with the drain port, the second system port with said second regenerating port, and the inlet port with said first regenerating port to thereby effect movement of the valve member of the brine valve to its second position and cause expulsion of concentrated brine from the storage tank for flow downwardly through the softener tank in consequence of the flow of hard water under pressure into the top of the storage tank, said valve element being operable to also automatically initiate downflow rinsing of the softener tank in its regenerating position as soon as hard water fills the upper portion of the storage tank to a depth corresponding to the level of the mouth of the brine outlet duct; and means on the valve element operable to vent said water inlet duct through said first regenerating port in the service position of the valve element, whereby the valve member of the brine valve can be promptly returned to said first position by the spring means acting thereon without interference from its fluid pressure responsive actuator as soon as the valve element is returned to its service position from its regenerating position.

2. The water softening system of claim 1, further characterized by means operable in the regenerating position of the valve element for limiting the flow of source water into the storage tank to a slow rate to thus preclude such turbulence as might cause admixture of incoming water with concentrated brine in the storage tank and dilution of the brine, and to assure slow downward passage of concentrated brine and thereafter rinse water through the softener tank, said flow limiting means being incorporated in a portion of the system downstream from said outlet port of the water inlet duct so as to assure that the full pressure of source water will be available in the inlet duct for positive operation of the fluid pressure actuator for the brine valve to said second position thereof.

3. The water softening system of claim 1, further characterized by means adjustably mounting said portion of the brine outlet duct on the storage tank to provide for disposition of the mouth thereof at any of a number levels in the storage tank and thus enable regulation of the volume of concentrated brine that can be expelled from the storage tank by water admitted thereto, without interfering with the flow of rinse water through the storage tank after the level of brine reaches the mouth of the brine outlet duct.

4. In a water softening system, the combination of: an upright softener tank containing ion exchange material and having means defining a pair of flow ports, one of which opens into a lower portion of the tank and the other of which opens into an upper portion of the tank; a control valve having a body provided with a hard water inlet port, a service outlet port, a drain port, a pair of system ports, one for each of said flow ports of the softener tank and connected therewith, first and second regenerating ports, a bore to which all of said valve ports open, and a valve element in the bore normally occupying a service position communicating its hard water inlet port with one of its system ports and its service port with the other of its system ports so that hard water to be softened flows through the softener tank and softened water issuing from the tank is available at the service outlet port of the control valve, said valve element being movable to a regenerating position at which it is adapted to effect both brining and rinsing of the ion exchange material in the softener tank and at which position the valve element communicates one of said system ports with the drain port and communicates its hard water inlet port with said first regenerating port and its second regenerating port with the remaining system port; means providing a substantially closed storage tank which is adapted to be filled with concentrated brine; means for expelling brine from the storage tank, comprising a brine outlet duct connected at one end with said second regenerating port and having a portion at its other end disposed inside the storage tank with its mouth spaced a distance from the top thereof, a water inlet duct connected at one end with said first regenerating port, a brine valve having an inlet port connected with the other end of the water inlet duct, a discharge port communicated with the top interior portion of the storage tank and communicable with said inlet port of the brine valve, a pressure responsive valve member controlling communication between said brine valve ports and movable from a normally closed position blocking communication between the brine valve ports to an open position allowing hard water to flow into the top portion of the storage tank from the water inlet duct in response to the pressure of hard water in the latter, so that water thus admitted into the top portion of the storage tank will displace to the softener tank all of the brine which is above the level of the mouth of the brine outlet duct, after which hard rinse water can enter the outlet duct for flow through the softener tank to rinse brine from the ion-exchange material therein, and a return spring at all times exerting force on the valve member to yieldingly hold the same in its closed position; and means governed by the valve element of the control valve for venting the inlet port of the brine valve in the service position of the valve element, whereby fluid pressure forces acting upon the valve member of the brine valve can be quickly dissipated and the valve member promptly returned to its closed position by the spring acting thereon as soon as the valve element of the control valve is returned to its service position from its regenerating position.

References Cited in the file of this patent
UNITED STATES PATENTS

| | | |
|---|---|---|
| 1,693,829 | Sweeney | Dec. 4, 1928 |
| 1,888,531 | Harwood et al. | Nov. 22, 1932 |
| 1,930,618 | Jones et al. | Oct. 17, 1933 |
| 2,748,990 | Kemper | June 5, 1956 |
| 2,825,359 | Williams | Mar. 4, 1958 |
| 2,855,944 | Albin | Oct. 14, 1958 |
| 2,902,155 | Lundeen | Sept. 1, 1959 |
| 3,089,508 | Schulze et al. | May 14, 1963 |